(12) United States Patent
Lum et al.

(10) Patent No.: US 6,409,782 B2
(45) Date of Patent: Jun. 25, 2002

(54) POWDER COMPOSITION AND METHOD FOR POLISHING STONE

(75) Inventors: Wing Thye Lum, 26 Bayshore Road, #21-02, Singapore 469972 (SG); Whee Huat Tan, Singapore 650404 (SG)

(73) Assignee: Wing Thye Lum, Singapore (SG)

( * ) Notice: Subject to any disclaimer, the term of this patent is extended or adjusted under 35 U.S.C. 154(b) by 0 days.

(21) Appl. No.: 09/729,887

(22) Filed: Dec. 4, 2000

(51) Int. Cl.⁷ .............................. C09K 3/14; C09G 1/02; C09G 1/04
(52) U.S. Cl. ................ 51/309; 51/307; 106/3; 451/41; 510/240
(58) Field of Search ........................ 51/307, 309; 106/3; 451/41; 510/240; 75/255

(56) References Cited

U.S. PATENT DOCUMENTS

| | | |
|---|---|---|
| 4,898,598 A | 2/1990 | Zapata |
| 5,123,958 A | 6/1992 | Wiand |
| 5,462,568 A | 10/1995 | Donatelli, Jr. |

FOREIGN PATENT DOCUMENTS

| | | |
|---|---|---|
| DE | 2142264 | 3/1972 |
| DE | 197 10 425 | 9/1998 |
| EP | 0 411 413 | 2/1991 |
| EP | 0 686 684 | 12/1995 |
| JP | 63216902 | 9/1988 |
| RO | 57755 | 12/1974 |
| RO | 84677 | 3/1985 |
| WO | WO 952677 A | 10/1999 |

OTHER PUBLICATIONS

Search Report Lum Wing Thye, Sep. 7, 2001, For Reference Only.

*Primary Examiner*—Michael Marcheschi
(74) *Attorney, Agent, or Firm*—Rutan & Tucker LLP; Robert D. Fish

(57) ABSTRACT

The present invention relates to a powder composition and to a method for polishing stone, in particular granite, said method making use of said powder composition.

11 Claims, No Drawings

POWDER COMPOSITION AND METHOD FOR POLISHING STONE

This application claims the benefit of Singapore Patent Application number 9906210-1, which was filed Dec. 9, 1999.

The present invention refers to a powder composition and to a method for polishing stone, in particular granite, said method making use of said powder composition.

Compounds and methods for polishing stone are known in the state of art. For example, U.S. Pat. No. 4,898,598 discloses a method for a polishing stone wherein the compound is a mixture of metallic oxides, a resin and a prepared gel, which compound is utilized in conjunction with sandpaper of varying grits to provide a smooth high gloss finish to the cut, rough-edged stone or marble.

U.S. Pat. No. 5,104,421 refers to a polishing method and abrasive pads, wherein the pad is manufactured with an abrasive such as alumina, zirconium oxide, tin oxide and cerium oxide, a kind of water-soluble cellulose ether and a kind of a solubilising agent. The substances above are blended and coated on a sheet-like substrate and, in the polishing process, only water is put between the rotating abrasive pads and the goods to be polished.

U.S. Pat. No. 5,462,568 discloses a universal stone polishing composition which includes an abrasive constituent and a composition which is a source of group Ia or group IIa metal ions when mixed with water.

A further composition and a method for polishing stone are disclosed in U.S. Pat. No. 5,551,960. According to said US patent, use is made of an abrasive article suitable for refining stone comprising an abrasive composite bonded to a backing, wherein the abrasive particles are dispersed in a binder.

Similarly, U.S. Pat. No. 5,942,015 discloses abrasive slurries, abrasive and articles made from the abrasive slurries. Furthermore, methods for the production of the abrasive articles are disclosed. The abrasive slurries and abrasive articles made therefrom comprise at least two grades of abrasive particles, i.e., a first larger grade and a second smaller grade wherein the abrasive grades have a medium particle size ratio of about 2 where the medium particle size ratio equals of the medium particle size of a larger grade of abrasive particles divided by the medium particle size of any smaller grade of abrasive particles.

The abrasive compositions according the state of art have the disadvantages that most of the abrasive particles have to be dispersed in a binder and to be coated onto a backing which is then placed on a pad of a scrubbing machine. This process is time and cost consuming as the pads have to be replaced from time to time.

Furthermore, the methods for polishing stone, in particular granite, have been carried out in the state of art in a process comprising several steps, approximately 5 to 7 and making use of polishing pads having different grits from 30 to 3500 microns. At the beginning, a polishing pad with grits of 3500 microns, in the next step a polishing pad having smaller grits, and so on, until in the last step, a polishing pad having grits having 30 to 100 microns are used to obtain a glossy surface again. As it can be taken from the afore, a lot of process steps are necessary in order to obtain satisfying results for the polished surface. Therefore, it is a long existing need for an improved process and an improved composition for polishing stone, in particular granite, which allows a more rapid polishing process. The inventors of the present invention surprisingly found that a powder composition of stannic oxide and a nickel-iron alloy can be used for obtaining superior results when being used in the inventive polishing method merely comprising two process steps.

The present invention is therefore directed to a powder composition comprising 10 to 40% by weight stannic oxide particles having a average particle size (D50 micron) of 1 to 10 $\mu$m, preferably 2.5–4.0 $\mu$m and 60 to 90% by weight of a stainless steel powder, having an apparent density of 4.5–5.0, preferably 4.7 kg/dm$^3$ and particle size of less than 0,5 mm, preferably less than 0.2 mm.

Preferably, the inventive powder composition comprises 20 to 30, most preferred 25% by 70 to 80, most preferred 75% by weight of a stainless steel powder having an apparent density of 4.7 kg/dm$^3$ and particle size of less than 0.2 mm.

If the inventive powder composition is used for polishing granite having a specific colour, the composition may additionally contain a colouring agent or pigment in order to assist in refreshing the colour of the granite during polishing. Said colouring agent or pigment may be added in an amount of up to 20% by weight of the composition. For example, said latter powder composition may have the following components:

| | | |
|---|---|---|
| Stannic Oxide | | 2 parts |
| Stainless Steel Shot/powder | | 7 parts |
| Colour: | for Black/Red | 2 parts |
| | for White/Grey | 1 part |

The inventive powder composition is prepared by mixing the two components together in a mixing vessel according to the above formulation for the two components. The important properties of the inventive powder mixture are the particle sizes of the two components in the mixture in order to obtain the results of the inventive polishing process.

Preferably, the stannic oxide particles have the following composition:

| | |
|---|---|
| Purity (% min.) | 99.0 |
| Fe2O3 (% min.) | 0.05 |
| Pb (% min.) | 0.05 |
| As (% min.) | 0.05 |
| Loss on Ignition (% min.) | 1.0 |
| Average Particle Size (D50 micron) | 2.5–4.0 |

According to the invention, the stainless steel powder is made from a nickel-iron alloy and has spherical grains. The powder has preferably an apparent density of 4.7 kg/dm$^3$. The particle size of the stainless steel powder is measured by sieving through a sieve of 0.5 mm, preferably 0.2 mm, wherein at least 95% of the powder particles pass through the sieve.

The inventive powder composition can be used in the inventive method for polishing stone and in particular for polishing granite.

In the first step of the inventive process, in order to hone or smoothen the surface of granite, a 10 inch to 20 inch, preferably a 17 inch pad driver is needed for holding 3 to 5 small pad holders for the 3 inch to 5 inch metal bond diamond disc. Preferably, each metal bond diamond disc is coated with particles of 5 to 100 microns which are used for resurfacing or smoothen the surface with any size or kind of floor machine with a speed of 150 to 300 rpm.

Said pad holder can be attached to any size of scrubbing machine of 10 inch to 20 inch to be operated with a speed of 150 rpm to 500 rpm. Preferably, a 17 inch scrubbing machine operated with 300 rpm is used.

After honing the surface of the granite in a first step, the inventive powder composition is sprinkled on the granite floor in the second step, and water is put onto the powder composition, preferably three ounces of water per 2 ounces of the inventive powder composition.

Thereafter, a white standard pad, made from Nylon or Polyester, is used to fit into any Standard floor scrubbing machine or Stone Grinder after removing the diamond disc. Following, the inventive powder composition is worked against the floor using the so equipped scrubbing machine with a rotation speed of 150–300 rpm. The purpose of the white pad is to hold the powder in place on the granite.

Then, the surface of the granite is slowly scrubbed for 1 to 2 minutes per square feet, this means, an area of 12 square feet which is treated for 2 minutes per square feet is treated for 24 minutes in total. If, during the scrubbing process, the floor dries up before the end of said two minutes, water is again added and scrubbing is continued until the glossy surface appears.

The result of a polishing process is measured on a gloss meter reading at 65 to 75 degrees for the surface treated according to the invention. It should be noted that a new granite surface has an average of 85 to 80 degrees whereas a hairline scratched surface of the granite floor has 4 degrees.

What is claimed is:

1. A stone polishing composition powder comprising:
    10 to 40% by weight of stannic oxide particles having an average particle size (D50 micron) of 1 to 10 $\mu$m; and
    60 to 90% by weight of a stainless steel powder having an apparent density of 4.5 to 5.0 Kg/dm$^3$ and a particle size of less than 0.5 mm.

2. The composition of claim 1 wherein the stannic oxide particles have an average particle size (D50 micron) of 2.5 to 4.0 $\mu$m.

3. The composition of claim 1 wherein the stainless steel powder has an apparent density of about 4.7 Kg/dm$^3$ and a particle size of less than 0.2 mm.

4. The composition of claim 1 further comprising at least one coloring agent or pigment in an amount of up to 20% by weight of the composition.

5. The composition of claim 1 further comprising at least one surfactant.

6. A method of polishing a stone, comprising:
    applying to a stone surface a polishing powder composition comprising 10 to 40% by weight of stannic oxide particles having an average particle size (D50 micron) of 1 to 10 $\mu$m, and 60 to 90% by weight of a stainless steel powder having an apparent density of 4.7 Kg/dm$^3$ and a particle size of less than 0.5 mm;
    supplying water to the powder composition; and
    working the composition against the surface for a period of time sufficient to obtain a glossy surface.

7. The method of claim 6 wherein the stannic oxide particles have an average particle size (D50 micron) of 2.5 to 4.0 $\mu$m.

8. The method of claim 6 wherein the stainless steel powder has an average particle size of less than 0.2 mm.

9. The method of claim 6 wherein the step of working is carried out by using a floor scrubbing machine operated at 175 to 300 rpm and having a pad size of 17 to 20 inches.

10. The method of claim 6 further comprising pre-honing the stone surface before applying the composition, wherein the pre-honing is achieved by using a floor scrubbing machine operated at 175 to 300 rpm and having a pad size of 17 to 20 inches.

11. The method of claim 6 wherein the stone surface comprises granite.

* * * * *